(12) United States Patent
Takahashi (10) Patent No.: US 10,663,842 B2
(45) Date of Patent: May 26, 2020

(54) OPTICAL SYSTEM AND IMAGE PROJECTION APPARATUS

(71) Applicant: CANON KABUSHIKI KAISHA, Tokyo (JP)

(72) Inventor: Makoto Takahashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/027,672

(22) Filed: Jul. 5, 2018

(65) Prior Publication Data

US 2019/0011816 A1 Jan. 10, 2019

(30) Foreign Application Priority Data

Jul. 6, 2017 (JP) .................... 2017-132432

(51) Int. Cl.
| | | |
|---|---|---|
| *G03B 21/14* | (2006.01) | |
| *G02B 13/16* | (2006.01) | |
| *G02B 15/20* | (2006.01) | |
| *G02B 13/02* | (2006.01) | |
| *G02B 15/177* | (2006.01) | |
| *G03B 21/00* | (2006.01) | |

(52) U.S. Cl.
CPC ............ *G03B 21/142* (2013.01); *G02B 13/02* (2013.01); *G02B 13/16* (2013.01); *G02B 15/177* (2013.01); *G02B 15/20* (2013.01); *G03B 21/006* (2013.01)

(58) Field of Classification Search
CPC .. G03B 21/142; G03B 21/006; G02B 15/177; G02B 13/02; G02B 15/20; G02B 13/16
See application file for complete search history.

(56) References Cited

U.S. PATENT DOCUMENTS

| 9,250,427 B2 | 2/2016 | Nagahara |
| 9,261,758 B2 | 2/2016 | Kuwata |
| 2017/0059972 A1 | 3/2017 | Ichimura |
| 2017/0153430 A1 | 6/2017 | Iijima et al. |

FOREIGN PATENT DOCUMENTS

| JP | 2014235217 A | 12/2014 |
| JP | 2016133572 A | 7/2016 |
| WO | 2013080953 A1 | 6/2013 |

OTHER PUBLICATIONS

Notice of Reasons for Rejection issued by the Japanese Patent Office dated Mar. 10, 2020 in corresponding Japanese Patent Application No. 2017-132432, with English translation.

*Primary Examiner* — Isiaka O Akanbi
*Assistant Examiner* — Danell L Owens
(74) *Attorney, Agent, or Firm* — Carter, DeLuca & Farrell LLP (57) ABSTRACT

The optical system includes an aperture stop, a plurality of lenses disposed on an enlargement conjugate side further than the aperture stop, and at least one lens disposed on a reduction conjugate side further than the aperture stop. The plurality of lenses includes, in order from the enlargement conjugate side to the reduction conjugate side, a first movable negative lens unit and a second movable negative lens unit each having a negative refractive power for changing field curvature by being moved in an optical axis direction of the optical system. The first and second movable negative lens units are moved such that at least one of their movement directions and their movement amounts are mutually different. The movement of the first and second movable negative lens units causes no change in conjugate length of an entire system of the optical system.

15 Claims, 7 Drawing Sheets

WIDE (2050mm)

FIG. 5

TELE (2050mm)

OPTICAL SYSTEM AND IMAGE PROJECTION APPARATUS

BACKGROUND OF THE INVENTION

Field of the Invention

The present invention relates to an optical system suitable for, for example, a projection lens of an image projection apparatus (projector).

Description of the Related Art

Projectors are used for projecting images onto not only a planar screen, but also a curved screen.

However, conventional projectors are designed for projecting images onto only the planar screen, so that projecting an image using the conventional projector onto the curved screen causes a defocused area in the projected image.

Japanese Patent Laid-Open No. 2014-235217 discloses a projection lens capable of projecting a wholly focused image onto a curved screen by moving a plurality of lenses.

However, in the projection lens disclosed in Japanese Patent Laid-Open No. 2014-235217, the movement amount of the plurality of lenses is large, and thereby a mechanism that moves the plurality of lenses has a complicated structure.

SUMMARY OF THE INVENTION

The present invention provides an optical system (or a projection lens) capable of changing field curvature while having a simple structure.

The present invention provides as an aspect thereof an optical system including an aperture stop, a plurality of lenses disposed on an enlargement conjugate side further than the aperture stop, and at least one lens disposed on a reduction conjugate side further than the aperture stop. The plurality of lenses includes, in order from the enlargement conjugate side to the reduction conjugate side, a first movable negative lens unit and a second movable negative lens unit each having a negative refractive power for changing field curvature by being moved in an optical axis direction of the optical system. The first and second movable negative lens units are moved such that at least one of their movement directions and their movement amounts are mutually different. The movement of the first and second movable negative lens units causes no change in conjugate length of an entire system of the optical system.

The present invention provides as another aspect thereof an image projection apparatus including the above optical system.

The present invention provides as yet another aspect thereof an image projection apparatus including a light modulation element configured to modulate light from a light source, and an optical system configured to project the light from the light modulation element. The optical system includes an aperture stop, a plurality of lenses disposed on an enlargement conjugate side further than the aperture stop, and at least one lens disposed on a reduction conjugate side further than the aperture stop. The plurality of lenses includes, in order from the enlargement conjugate side to the reduction conjugate side, a first movable negative lens unit and a second movable negative lens unit each having a negative refractive power for changing field curvature by being moved in an optical axis direction of the optical system, the first and second movable negative lens units are moved such that at least one of their movement directions and their movement amounts are mutually different, and the optical system is configured to perform variation of magnification. The following condition is satisfied:

$$dL \leq pFw$$

where dL represents a change amount of a conjugate length between before and after the movement of the first and second movable negative lens units, p represents a pixel pitch of the light modulation element, and Fw represents an F-number of the optical system at its wide-angle end.

Further features of the present invention will become apparent from the following description of exemplary embodiments with reference to the attached drawings.

DESCRIPTION OF THE EMBODIMENTS

Preferred embodiments will be described below with reference to the attached drawings. First, prior to description of specific embodiments (numerical examples) 1 to 3, with reference to FIG. 1, description will be made of basic matters common to optical systems of the embodiments (denoted by 1, 21 and 31 in FIGS. 1, 4 and 7).

Figure 1:
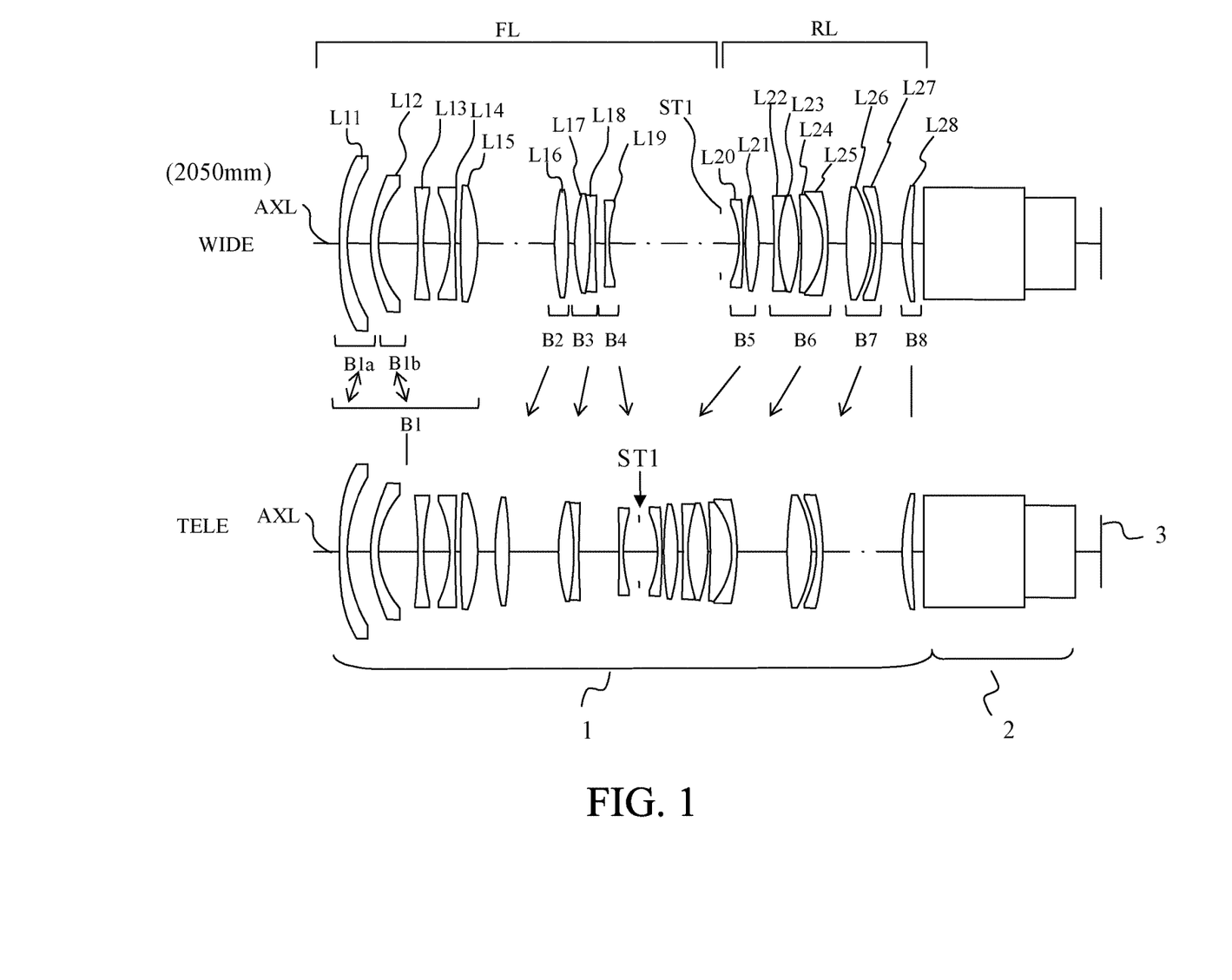
FIG. 1 is a sectional view illustrating configurations of an optical system (projection distance 2,050 mm) that is Embodiment 1 of the present invention at its wide-angle end and telephoto end.

The optical system of each embodiment is used as a projection lens that projects light entering from a reduction conjugate side (light modulation element side) that is the right side in FIG. 1 to an enlargement conjugate side (projection surface side) that is the left side in FIG. 1. A light modulation element 3 illustrated in FIG. 1 modulates light from a light source (not illustrated) depending on an input image signal. The light modulation element 3 is constituted by a liquid crystal panel, a digital micromirror device or others. An optical block 2 introduces the light from the light modulation element 3 to the projection lens. The optical block 2 is constituted by a prism, a filter and others.

The optical system of each embodiment includes an aperture stop ST1 (ST2 and ST3 in FIGS. 4 and 7), a front side lens group FL disposed on an enlargement conjugate side (left side in the drawing) further than the aperture stop ST1 and a rear side lens group RL disposed on a reduction conjugate side (right side in the drawing) further than the aperture stop ST1.

The front side lens group FL includes two lens units each having a negative refractive power for changing field curvature by being moved in an optical axis direction in which an optical axis AXL of the optical system extends.

The two lens units are a negative lens unit B1a (B21a and B31a in FIGS. 4 and 7) as a first movable negative lens unit and a negative lens unit B1b (B21b and B31b in FIGS. 4 and 7) as a second movable negative lens unit. The negative lens unit B1a and the negative lens unit B1b are disposed in order from the enlargement conjugate side to the reduction conjugate side. In order to change the field curvature, the negative lens units B1a and B1b are moved in the optical axis direction such that at least one of their movement directions and their movement amounts are mutually different (in other words, the negative lens units B1a and B1b are moved independently from each other). That is, the negative lens units B1a and B1b as movable negative lens units are included in a first lens unit described later and are each constituted by one or a plurality of lenses. The negative lens units B1a and B1b are moved independently from each other for adjusting the field curvature.

The front side lens group FL includes first to fourth lens units (B1 to B4 in FIG. 1) disposed in order from the enlargement conjugate side to the reduction conjugate side. The rear side lens group RL includes fifth to eighth lens units (B5 to B8 in FIG. 1) disposed in order from the enlargement conjugate side to the reduction conjugate side. The optical system of each embodiment moves the second, third, fourth, fifth, sixth and seventh lens units in the optical axis direction so as to change distances between respective two lens units mutually adjacent in the optical axis direction to perform variation of magnification from a wide-angle end to a telephoto end. Furthermore, the optical system of each embodiment moves lenses L13, L14 and L15 in the first lens unit in the optical axis direction to perform focusing. The movement amounts of the lenses L14 and L15 for focusing are equal to each other.

The optical system of each embodiment includes the first to eight lens units as a plurality of lenses in which distances in the optical axis direction between mutually adjacent lens units thereof are changed during the variation of magnification.

The distance in the optical axis direction between the mutually adjacent lens units is, for example in FIG. 1, a distance between the first lens unit B1 and the second lens unit B2, and a distance between the third lens unit B3 and the fourth lens unit B4. That is, the distance between the mutually adjacent lens units, which changes with the variation of magnification, is a boundary between these lens units. The change of the distance between the mutually adjacent lens units also includes a change of a distance between lens units fixed and moved during the variation of magnification, such as that between the first and second lens units B1 and B2.

Each lens unit in each embodiment may include a plurality of lenses or only one lens. That is, the distances between the first to eighth lens units, which change with the variation of magnification, are boundaries between these lens units. The distance between the first and second movable negative lens units, which changes with the variation of magnification, is a boundary therebetween.

A more detail description of the negative lens units B1a and B1b will be made below.

In the optical system of each embodiment, the negative lens unit B1a is disposed at a most-enlargement conjugate side position, and the negative lens unit B1b is disposed at a position adjacent to the negative lens unit B1a on the reduction conjugate side.

The negative lens unit B1a is constituted by one negative lens L11, and the negative lens unit B1b is constituted by one negative lens L12. The negative lens unit B1a provides a larger change amount of the field curvature to an identical movement amount than that of the negative lens unit B1b. On the other hand, the negative lens unit B1b provides a larger change amount of a back focus (BF) for an identical movement amount than that of the negative lens unit B1a. Moving the negative lens units B1a and B1b having such a relation such that at least one of their movement directions and their movement amounts are mutually different enables changing the field curvature while reducing change in back focus.

Next, description will be made of an example of the movement directions of the negative lens units B1a and B1b. Moving the negative lens units B1a and B1b in an identical direction reduces the change amount of the field curvature provided by the movement of the negative lens units B1a and B1b because their movement changes the field curvature in mutually opposite directions. On the other hand, moving the negative lens units B1a and B1b in mutually opposite directions provides a sufficient change amount of the field curvature even when their movement amounts are small because the change amounts of the field curvature thereby are mutually added. Therefore, in order to change the field curvature while reducing the change in back focus, it is desirable to move the negative lens units B1a and B1b in mutually opposite directions.

Next, description will be made of the movement amounts of the negative lens units B1a and B1b. The negative lens units B1a and B1b are moved in the optical axis direction by cams provided in a cam ring (not illustrated) rotatable about the optical axis AXL. Each embodiment appropriately sets the movement directions of the negative lens units B1a and B1b and the movement amounts thereof (that is, shapes of the cams moving them). This enables keeping a distance between an object surface and an image surface, that is, a conjugate length unchanged (constant) between before and after the change in field curvature (or before and after the movement of the negative lens units B1a and B1b) or reducing its change. For the projection lens of the projector, the object surface corresponds to a light modulation surface of the light modulation element 3, and the image surface corresponds to a projection surface such as a screen.

Each embodiment (each numerical example described later) sets the movement directions and movement amounts of the negative lens units B1a and B1b such that, when the negative lens unit B1a is moved by +1 mm, the negative lens unit B1b is moved by −0.246 mm.

Next, description will be made of conditions that the optical system of each embodiment is desirable to satisfy.

The optical system of each embodiment satisfies the following condition expressed by expression (1) to provide a sufficient change amount of the field curvature while reducing change in back focus.

$$0.01 \leq \varphi b / \varphi a \leq 3.00 \tag{1}$$

In expression (1), φa represents a refractive power of the negative lens unit B1a, and φb represents a refractive power of the negative lens unit B1b. A lower value of φb/φa than the lower limit of expression (1) makes the refractive power of the negative lens unit B1a excessively high to that of the negative lens unit B1b, which increases the change amount of the back focus by the movement of the negative lens unit B1a. This may make it impossible to sufficiently reduce the change in back focus by the movement of the negative lens unit B1b. A higher value of φb/φa than the upper limit of expression (1) makes the refractive power of the negative lens unit B1a too week, which increases the movement amount of the negative lens unit B1a for adjusting the field curvature or makes it impossible to sufficiently adjust the field curvature. The lower limit of expression (1) may be 0.05 or 0.1.

It is more desirable that the optical system of each embodiment satisfy the following condition expressed by expression (1)' having a narrower range than that of expression (1).

$$0.30 \leq \varphi b/\varphi a \leq 1.30 \quad (1)'$$

The optical system of each embodiment satisfies the following condition expressed by expression (2) to provide a sufficient change amount of the field curvature.

$$-8 \leq \varphi w/\varphi a \leq -3 \quad (2)$$

In expression (2), φw represents a refractive power of an entire system of the optical system (that is, the entire optical system) at the wide-angle end.

A higher value of φw/φa than the upper limit of expression (2) makes the refractive power of the negative refractive power B1a too strong, which excessively increases the change amount of the field curvature to the movement amount of the negative refractive power B1a. This results in making it difficult to control the change amount of the field curvature. A lower value of φw/φa than the lower limit of expression (2) makes the refractive power of the negative refractive power B1a too week, which makes it impossible to provide a sufficient change amount of the field curvature by the movement of the negative refractive power B1a or makes a movement amount of the negative refractive lens B1a necessary for adjusting the field curvature too large.

It is more desirable that the optical system of each embodiment satisfy the following condition expressed by expression (2)' having a narrower range than that of expression (2).

$$-7.0 \leq \varphi w/\varphi a \leq -4.5 \quad (2)'$$

The optical system of each embodiment satisfies the following condition expressed by expression (3) by using an aspheric surface in the negative lens unit B1a to reduce the change in back focus while increasing the change amount of the field curvature.

$$4 \leq Rc/Rm \leq 35 \quad (3)$$

In expression (3), Rc represents a paraxial curvature radius of a most-enlargement conjugate side lens surface of the negative lens unit B1a, and Rm represents a most-peripheral effective portion of the most-enlargement conjugate side lens surface of the negative lens unit B1a. The condition of expression (3) means that a difference between local refractive powers around an axial light flux and around a peripheral light flux is appropriately set.

It is more desirable that the optical system of each embodiment satisfy the following condition expressed by expression (3)' having a narrower range than that of expression (3).

$$6 \leq Rc/Rm \leq 26 \quad (3)'$$

It is more desirable that the optical system of each embodiment satisfy the following condition expressed by expression (4).

$$dL \leq pFw \quad (4)$$

In expression (4), dL represents a change amount of the conjugate length between before and after the change in field curvature (that is, before and after the movement of the negative lens units B1a and B1b), p represents a pixel pitch of the light modulation element as an object, and Fw represents an F-number of the optical system at the wide-angle end. Satisfying the condition of expression (4) makes defocus less likely to occur in the entire field angle (that is, the entire projected image), thereby providing a good optical performance. As long as satisfying the condition of expression (4), the change in field curvature causes less degradation in the projected image, so that it can be said that the conjugate length is substantially kept constant.

It is further desirable that the optical system of each embodiment satisfy the following condition expressed by expression (5).

$$25° \leq \omega w \leq 36° \quad (5)$$

In expression (5), ωw represents an angle (so-called a half field angle) formed by the optical axis AXL and an outermost off-axis ray at the wide-angle end. That is, the optical system of each embodiment is not a special optical system having a super wide field angle, but an optical system having a typical field angle.

Satisfying the above-described conditions enables, while having a simple structure, providing a projection lens for projectors having a good optical performance capable of projecting a wholly focused projected image onto a planar screen and a curved screen.

Although it is desirable that the negative lens units B1a and B1b be each constituted by one lens in order to simplify their optical configurations, the negative lens units B1a and B1b may be constituted by two or more lenses. In addition, although the optical system of each embodiment is a zoom lens, the optical system may be a single focus lens.

Furthermore, although the optical system of each embodiment includes the aperture stop as a physical aperture stop, such a physical aperture stop is not necessarily needed to be provided. When the physical aperture stop is not provided, the position of the aperture stop may be defined as a position at which off-axis principal rays intersect with the optical axis of the optical system. Even when the physical aperture stop is provided, this physical aperture stop is not necessarily to be an aperture stop device and may be a member such as a barrel member housing the optical system.

Embodiment 1

Description will be made of Embodiment 1 (Numerical example 1). FIG. 1 is a sectional view of a projection lens (whose projection distance 2,050 mm) 60 using the optical system 1 of Embodiment 1. The projection lens includes the following first to eighth lens units B1 to B8 disposed in order from the enlargement conjugate side to the reduction conjugate side.

The first lens unit B1 has a negative refractive power and is fixed during the variation of magnification. The second lens unit B2 has a positive refractive power and is moved during the variation of magnification. The third lens unit B3 has a positive refractive power and is moved during the variation of magnification. The fourth lens unit B4 has a negative refractive power and is moved during the variation of magnification. The fifth lens unit B5 has a positive refractive power and is moved during the variation of magnification. The sixth lens unit B6 has a positive refractive power and is moved during the variation of magnification. The seventh lens unit B7 has a positive refractive power and is moved during the variation of magnification. The eighth lens unit B8 has a positive refractive power and is fixed during the variation of magnification.

The aperture stop ST1 is disposed between the fourth lens unit B4 and the fifth lens unit B5 (on the enlargement conjugate side further than the fifth lens unit B5) and is moved during the variation of magnification together with the fifth lens unit B5.

The first lens unit B1 is constituted by five lenses L11 to L15 that are negative, negative, negative, negative and positive lenses disposed in order from the enlargement conjugate side. The negative lens L11 is the above-described negative lens unit B1a, and the negative lens L12 is the above-described negative lens unit B1b. The second lens unit B2 is constituted by one positive lens L16. The third lens unit B3 is constituted by two lenses L17 and L18 that are positive and negative lenses disposed in order from the enlargement conjugate side. The fourth lens unit B4 is constituted by one negative lens L19. The fifth lens unit B5 is constituted by two lenses L20 and L21 that are negative and positive lenses disposed in order from the enlargement conjugate side. The sixth lens unit B6 is constituted by four lenses L22 to L25 that are negative, positive, positive and negative lenses disposed in order from the enlargement conjugate side. The seventh lens unit B7 is constituted by two lenses L26 and L27 that are positive and negative lenses disposed in order from the enlargement conjugate side. The eighth lens unit B8 is constituted by one positive lens L28.

The optical system 1 of this embodiment satisfies the above-described conditions of expressions (1) to (5). The values of expressions (1) to (5) are shown in Table 1(C).

Figure 10:
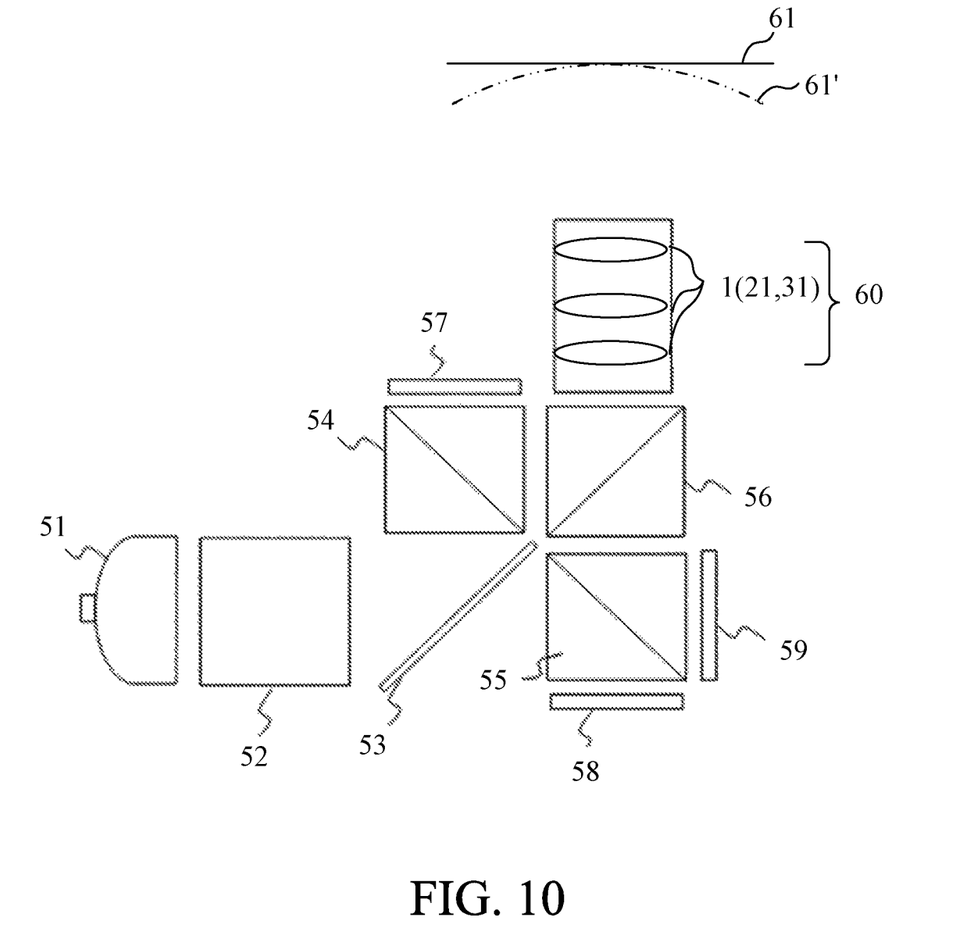
FIG. 10 is a sectional view of a projector using the optical system of any one of Embodiments 1 to 3.

FIG. 10 illustrates a configuration of a liquid crystal projector using the projection lens of this embodiment (or of the other embodiments described later).

Light as white non-polarized light emitted from a light source 51 is converted by an illumination optical system 52 into linearly polarized light having a specific polarization direction. The white linearly polarized light subjected to optical actions of the illumination optical system 52 illuminates evenly each of three liquid crystal elements 57, 58 and 59. The white linearly polarized light exiting from the illumination optical system 52 is separated by a dichroic mirror 53 and a first polarization beam splitter 55 into a red (R) light, a green (G) light and a blue (B) light. The R light, the G light and the B light are respectively introduced to the liquid crystal elements 57, 58 and 59 for R, G and B.

The R light, the G light and the B light respectively modulated by the liquid crystal elements 57, 58 and 59 are combined by a second polarization beam splitter 54 and a color combining prism 56 to be introduced to the projection lens 60. The combined light is projected through the projection lens 60 onto a curved screen 61. The projection lens 60 is the optical system 1 described in this embodiment (or any one of the optical systems 21 and 31 described later in the other embodiments) held by a lens barrel 60a.

Although FIG. 1 illustrates the curved screen 61 having a concave surface toward the projection lens 60, a curved screen may have a convex surface toward the projection lens 60.

Figure 2:
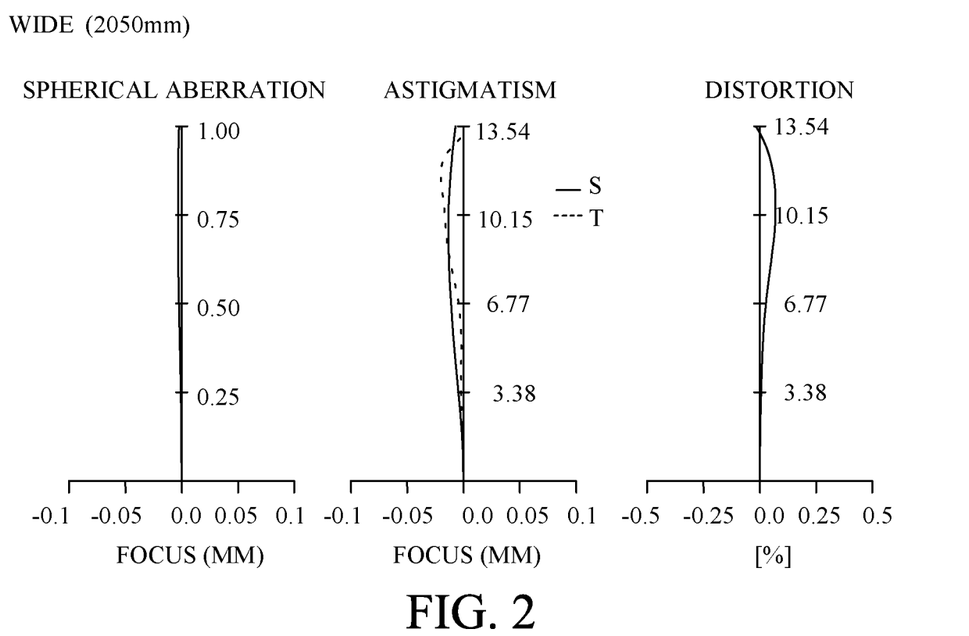
FIG. 2 illustrates aberration diagrams of the optical system of Embodiment 1 at the wide-angle end.
Figure 3:
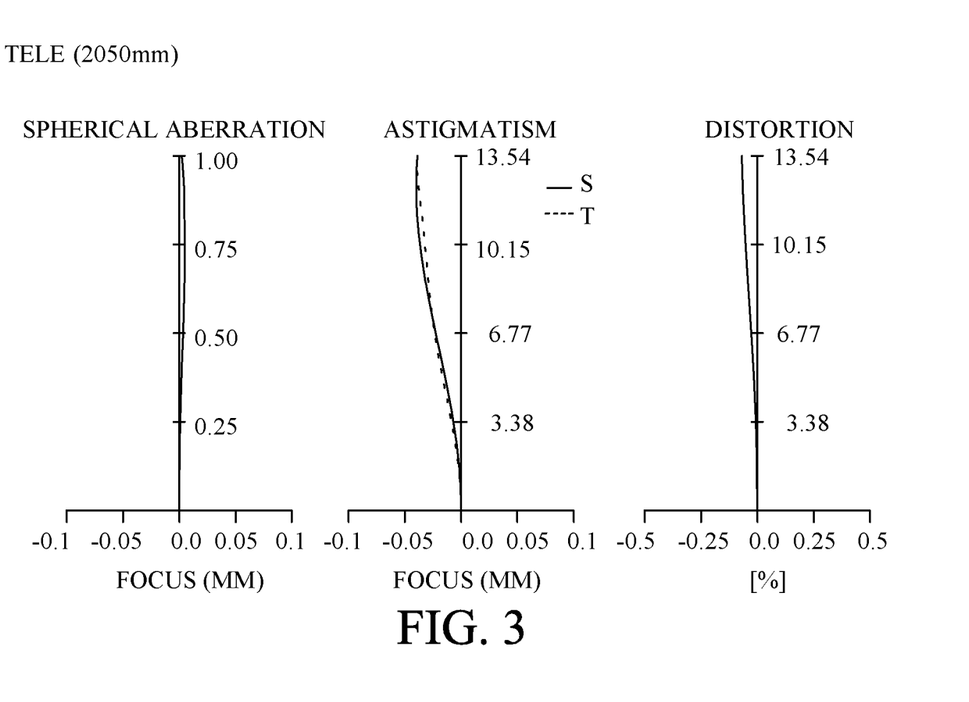
FIG. 3 illustrates aberration diagrams of the optical system of Embodiment 1 at the telephoto end.

FIG. 2 and FIG. 3 respectively illustrate spherical aberrations (for a d-line), astigmatisms (S indicates a sagittal plane, and T indicates a tangential plane) and distortions (for the d-line) that are longitudinal aberrations of the projection lens 60 (whose projection distance is 2,050 mm) of Numerical example 1 at the wide-angle end and the telephoto end.

Embodiment 2

Figure 4:
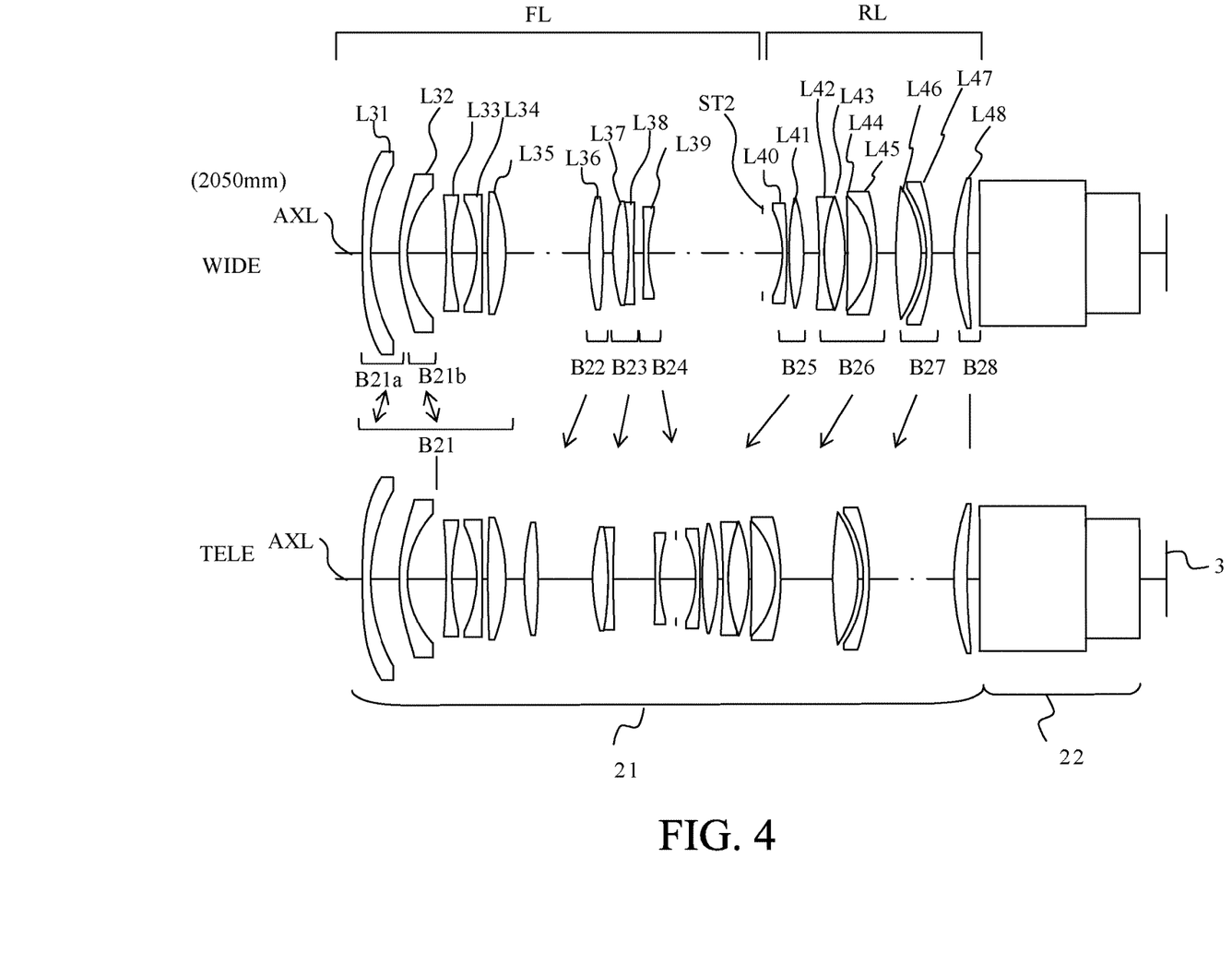
FIG. 4 is a sectional view illustrating configurations of an optical system (projection distance 2,050 mm) that is Embodiment 2 of the present invention at its wide-angle end and telephoto end.

FIG. 4 is a sectional view of a projection lens (whose projection distance 2,050 mm) using the optical system 21 of Embodiment 2 (Numerical example 2). The optical system 21 includes the following first to eighth lens units B21 to B28 disposed in order from the enlargement conjugate side to the reduction conjugate side.

In this embodiment, a paraxial curvature radius of a most-enlargement conjugate side lens surface of the negative lens unit B21a is larger than a most-peripheral effective portion of the most-enlargement conjugate side lens surface of the negative lens unit B1a. That is, a difference between local refractive powers around an axial light flux and around a peripheral light flux is appropriately set. Thereby, this embodiment enables, while having a simple structure, reducing the movement amounts of the negative lens units B21a and B21b and changing the field curvature while reducing change in back focus.

The first lens unit B21 has a negative refractive power and is fixed during the variation of magnification. The second lens unit B22 has a positive refractive power and is moved during the variation of magnification. The third lens unit B23 has a positive refractive power and is moved during the variation of magnification. The fourth lens unit B24 has a negative refractive power and is moved during the variation of magnification. The fifth lens unit B25 has a positive refractive power and is moved during the variation of magnification. The sixth lens unit B26 has a negative refractive power and is moved during the variation of magnification. The seventh lens unit B27 has a positive refractive power and is moved during the variation of magnification. The eighth lens unit B28 has a positive refractive power and is fixed during the variation of magnification.

The aperture stop ST2 is disposed between the fourth lens unit B24 and the fifth lens unit B25 (on the enlargement conjugate side further than the fifth lens unit B25) and is moved during the variation of magnification together with the fifth lens unit B25.

The first lens unit B21 is constituted by five lenses L31 to L35 that are negative, negative, negative, negative and positive lenses disposed in order from the enlargement conjugate side. The negative lens L31 is the above-described negative lens unit B21a, and the negative lens L32 is the above-described negative lens unit B21b. The second lens unit B22 is constituted by one positive lens L36. The third lens unit B23 is constituted by two lenses L37 and L38 that are positive and negative lenses disposed in order from the enlargement conjugate side. The fourth lens unit B24 is constituted by one negative lens L39. The fifth lens unit B25 is constituted by two lenses L40 and L41 that are negative and positive lenses disposed in order from the enlargement conjugate side. The sixth lens unit B26 is constituted by four lenses L42 to L45 that are negative, positive, positive and negative lenses disposed in order from the enlargement conjugate side. The seventh lens unit B27 is constituted by two lenses L46 and L47 that are positive and negative lenses disposed in order from the enlargement conjugate side. The eighth lens unit B28 is constituted by one positive lens L48.

The optical system 21 of this embodiment satisfies the above-described conditions of expressions (1) to (5). The values of expressions (1) to (5) are shown in Table 2(C).

Figure 5:
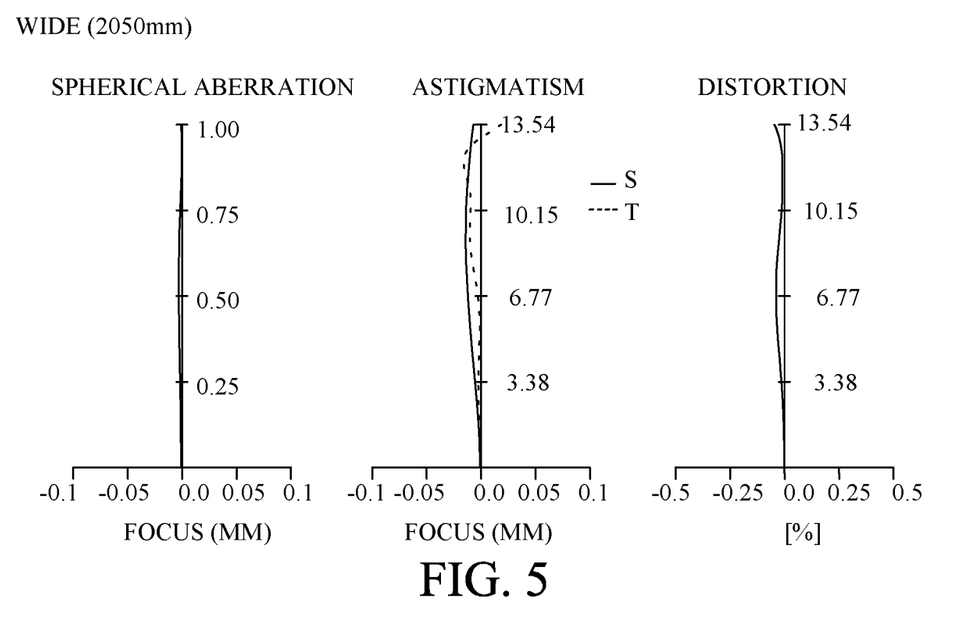
FIG. 5 illustrates aberration diagrams of the optical system of Embodiment 2 at the wide-angle end.
Figure 6:
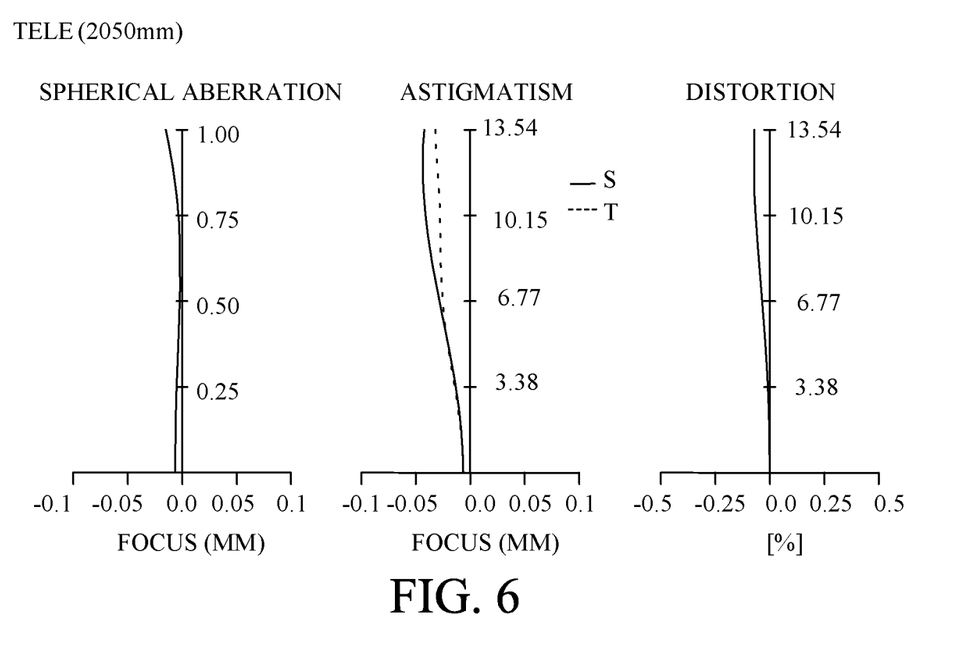
FIG. 6 illustrates aberration diagrams of the optical system of Embodiment 2 at the telephoto end.

FIG. 5 and FIG. 6 respectively illustrate spherical aberrations (for the d-line), astigmatisms (S indicates the sagittal plane, and T indicates the tangential plane) and distortions (for the d-line) that are longitudinal aberrations of the projection lens (whose projection distance is 2,050 mm) of Numerical example 2 at the wide-angle end and the telephoto end.

Embodiment 3

Figure 7:
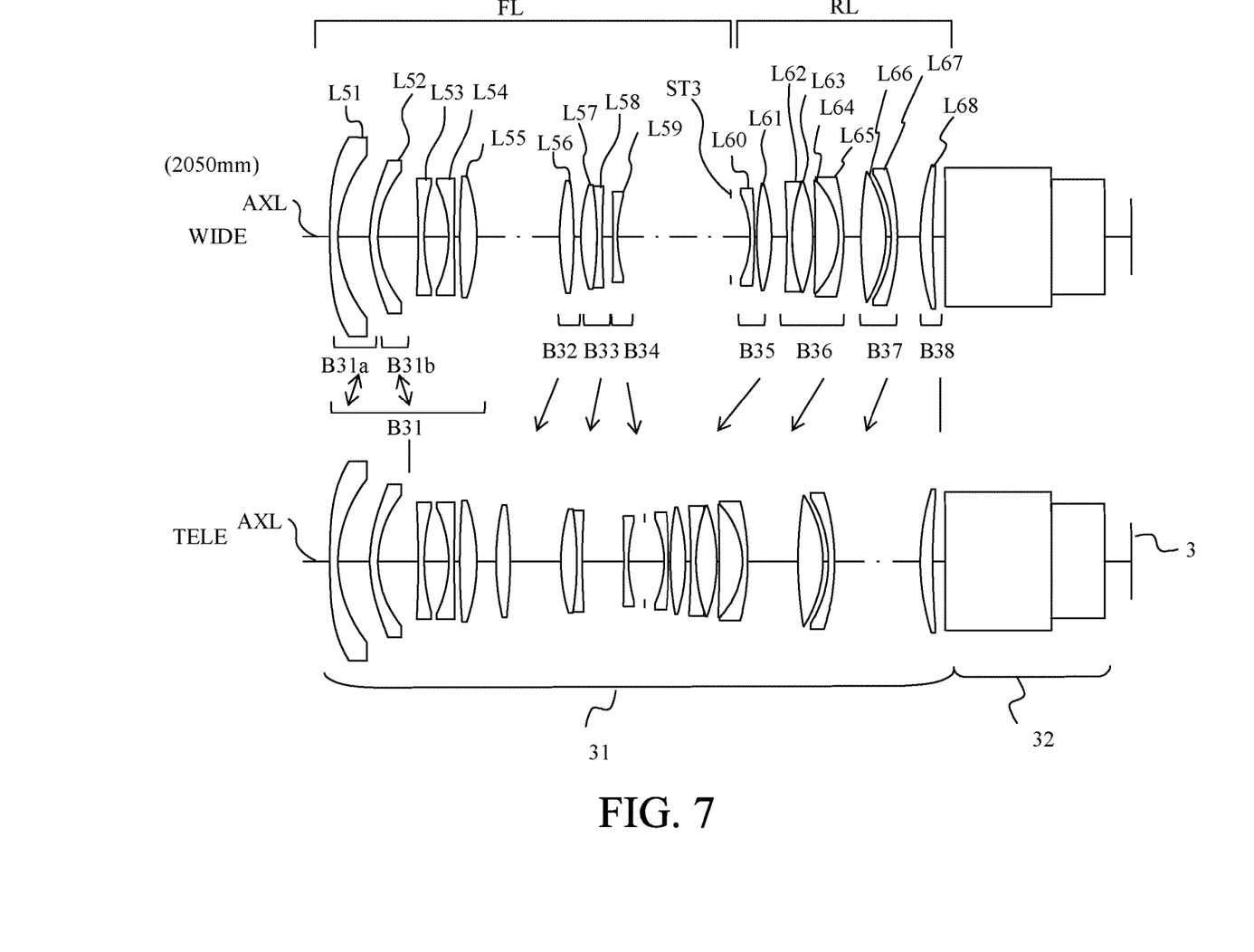
FIG. 7 is a sectional view illustrating configurations of an optical system (projection distance 2,050 mm) that is Embodiment 3 of the present invention at its wide-angle end and telephoto end.

FIG. 7 is a sectional view of a projection lens (whose projection distance 2,050 mm) using the optical system 31 of Embodiment 3 (Numerical example 3). The optical system 31 includes the following first to eighth lens units B31 to B38 disposed in order from the enlargement conjugate side to the reduction conjugate side.

In this embodiment, the negative lens unit B3$a$ has a refractive power stronger than that of the negative lens unit B1$a$ in Embodiment 1. This embodiment also satisfies the conditions of expressions (1) and (2) and thereby enables, while having a simple structure, changing the field curvature while reducing change in back focus.

The first lens unit B31 has a negative refractive power and is fixed during the variation of magnification. The second lens unit B32 has a positive refractive power and is moved during the variation of magnification. The third lens unit B33 has a positive refractive power and is moved during the variation of magnification. The fourth lens unit B34 has a negative refractive power and is moved during the variation of magnification. The fifth lens unit B35 has a positive refractive power and is moved during the variation of magnification. The sixth lens unit B36 has a positive refractive power and is moved during the variation of magnification. The seventh lens unit B37 has a positive refractive power and is moved during the variation of magnification. The eighth lens unit B38 has a positive refractive power and is fixed during the variation of magnification.

The aperture stop ST3 is disposed between the fourth lens unit B34 and the fifth lens unit B35 (on the enlargement conjugate side further than the fifth lens unit B35) and is moved during the variation of magnification together with the fifth lens unit B35.

The first lens unit B31 is constituted by five lenses L51 to L55 that are negative, negative, negative, negative and positive lenses disposed in order from the enlargement conjugate side. The negative lens L51 is the above-described negative lens unit B31$a$, and the negative lens L52 is the above-described negative lens unit B31$b$. The second lens unit B32 is constituted by one positive lens L56. The third lens unit B33 is constituted by two lenses L57 and L58 that are positive and negative lenses disposed in order from the enlargement conjugate side. The fourth lens unit B34 is constituted by one negative lens L59. The fifth lens unit B35 is constituted by two lenses L60 and L61 that are negative and positive lenses disposed in order from the enlargement conjugate side. The sixth lens unit B36 is constituted by four lenses L62 to L65 that are negative, positive, positive and negative lenses disposed in order from the enlargement conjugate side. The seventh lens unit B37 is constituted by two lenses L66 and L67 that are positive and negative lenses disposed in order from the enlargement conjugate side. The eighth lens unit B38 is constituted by one positive lens L68.

The optical system 31 of this embodiment satisfies the above-described conditions of expressions (1) to (5). The values of expressions (1) to (5) are shown in Table 3(C).

Figure 8:
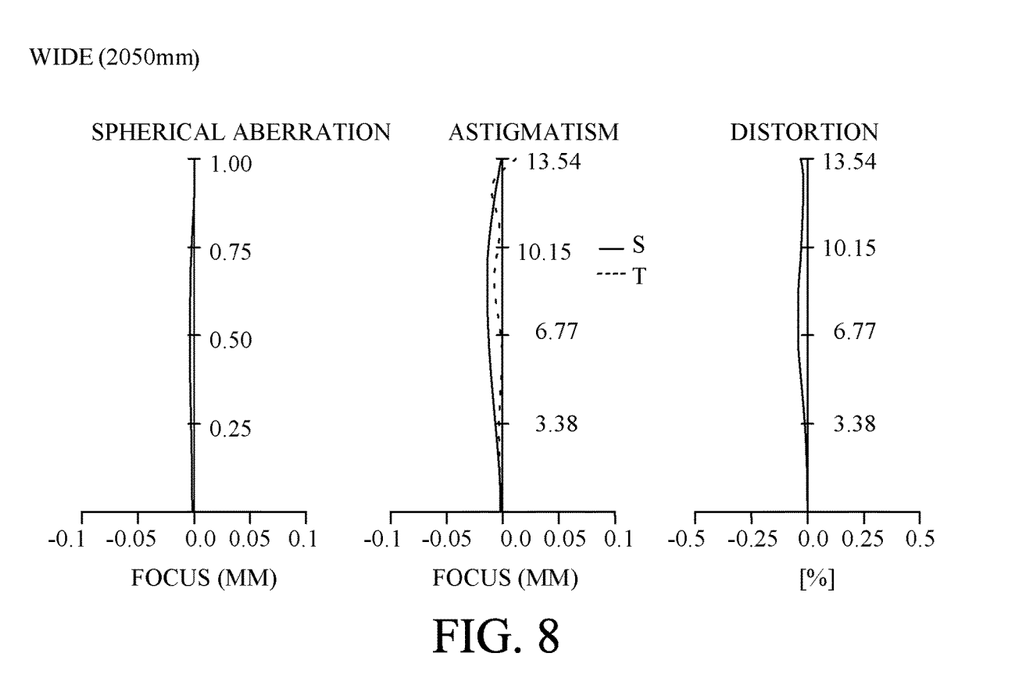
FIG. 8 illustrates aberration diagrams of the optical system of Embodiment 3 at the wide-angle end.
Figure 9:
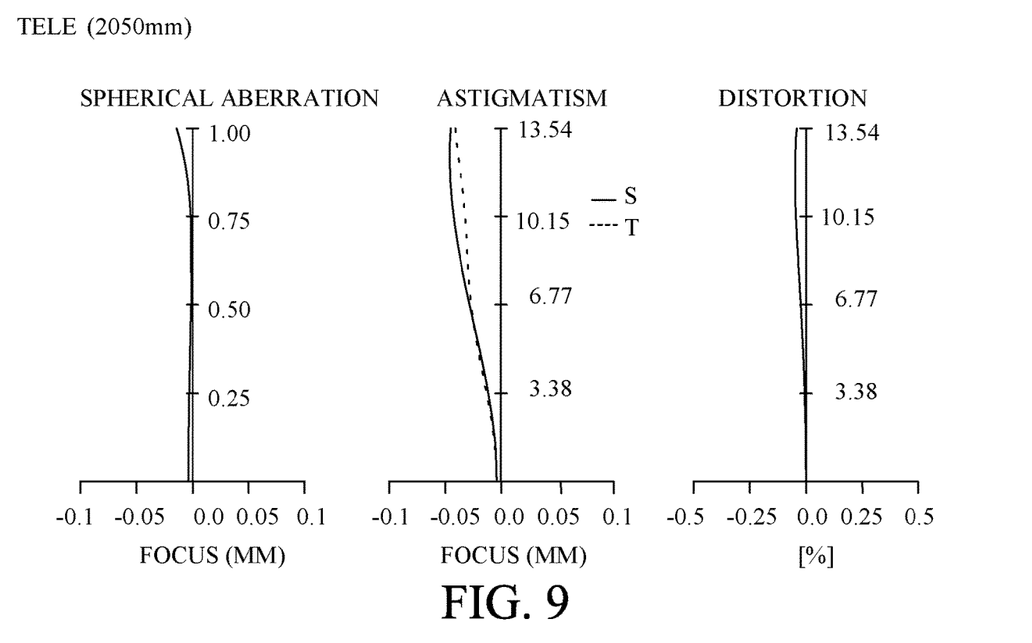
FIG. 9 illustrates aberration diagrams of the optical system of Embodiment 3 at the telephoto end.

FIG. 8 and FIG. 9 respectively illustrate spherical aberrations (for the d-line), astigmatisms (S indicates the sagittal plane, and T indicates the tangential plane) and distortions (for the d-line) that are longitudinal aberrations of the projection lens (whose projection distance is 2,050 mm) of Numerical example 3 at the wide-angle end and the telephoto end.

In the following Tables 1 to 3, (A) shows a lens configuration, f represents a focal length, and F represents an aperture ratio. Furthermore, ri represents a curvature radius (mm) of an i-th surface counted from the enlargement conjugate side, di represents a distance (mm) between the i-th surface and a (i+1)-th surface, ni and vi respectively represent a refractive index and abbe number of an i-th optical member counted from the enlargement conjugate side for the d-line, and ST represents a position of the aperture stop.

A surface to which "*" is added on its left side has an aspheric surface expressed by the following function. In the following Tables 1 to 4, (B) shows aspheric coefficients A to G. Moreover, y represents a coordinate in a lens radial direction, z represents a coordinate in the optical axis direction, k represents a conic coefficient, and "e-X" represents "$\times 10^{-X}$".

$$z(y)=(y^2/ri)/\{1+[1-(1+k)(y^2/ri^2)]^{1/2}\}+Ay^4+By^6+Cy^8+Dy^{10}+Ey^{12}+Fy^{14}+Gy^{16}$$

TABLE 1

(Numerical example 1)

(A) lens configuration

| | Wide | Tele |
|---|---|---|
| f | 22.75 | 39.94 |
| F | 2.60 | 2.97 |
| Field angle | 30.7 | 18.7 |
| Total lens length | 220.0 | |
| BF | 72.6 | |
| Zoom ratio | | 1.76 |

| | | | | |
|---|---|---|---|---|
| * | r1 = 269.66 | d1 = 3.00 | n1 = 1.516 | v1 = 64.1 |
| | r2 = 53.82 | d2 = 9.10 | | |
| * | r3 = 46.93 | d3 = 3.00 | n2 = 1.773 | v2 = 49.6 |
| | r4 = 32.60 | d4 = 15.17 | | |
| | r5 = −168.33 | d5 = 2.10 | n3 = 1.497 | v3 = 81.5 |
| | r6 = 82.31 | d6 = 10.17 | | |
| | r7 = −43.60 | d7 = 2.00 | n4 = 1.497 | v4 = 81.5 |
| | r8 = 409.66 | d8 = 2.00 | | |
| | r9 = 283.69 | d9 = 6.60 | n5 = 1.694 | v5 = 50.8 |
| | r10 = −65.53 | d10 = variable | | |
| | r11 = 90.91 | d11 = 5.30 | n6 = 1.678 | v6 = 55.3 |
| | r12 = −147.87 | d12 = variable | | |
| | r13 = 65.53 | d13 = 5.90 | n7 = 1.717 | v7 = 29.5 |
| | r14 = −100.81 | d14 = 1.90 | n8 = 1.805 | v8 = 25.5 |
| | r15 = 251.33 | d15 = variable | | |
| | r16 = −656.56 | d16 = 1.60 | n9 = 1.717 | v9 = 47.9 |
| | r17 = 50.86 | d17 = variable | | |
| ST | r18 = ∞ | d18 = 7.20 | | |
| | r19 = −34.87 | d19 = 1.60 | n10 = 1.606 | v10 = 43.7 |
| | r20 = −193.81 | d20 = 0.75 | | |
| | r21 = 111.02 | d21 = 5.40 | n11 = 1.808 | v11 = 22.8 |
| | r22 = −65.81 | d22 = variable | | |
| | r23 = −339.98 | d23 = 1.80 | n12 = 1.855 | v12 = 24.8 |
| | r24 = 56.76 | d24 = 7.70 | n13 = 1.516 | v13 = 64.1 |
| | r25 = −56.76 | d25 = 1.03 | | |
| | r26 = −232.28 | d26 = 8.20 | n14 = 1.607 | v14 = 56.8 |
| | r27 = −29.11 | d27 = 2.00 | n15 = 1.855 | v15 = 24.8 |
| | r28 = −83.70 | d28 = variable | | |
| | r29 = 128.06 | d29 = 9.30 | n16 = 1.439 | v16 = 94.7 |
| | r30 = −45.05 | d30 = 2.00 | | |
| | r31 = −44.43 | d31 = 2.40 | n17 = 1.673 | v17 = 38.2 |
| | r32 = −85.14 | d32 = variable | | |
| | r33 = 78.89 | d33 = 3.80 | n18 = 1.946 | v18 = 18.0 |
| | r34 = 221.59 | d34 = 4.50 | | |

TABLE 1-continued

(Numerical example 1)

| | | | |
|---|---|---|---|
| r35 = ∞ | d35 = 38.70 | n19 = 1.516 | ν19 = 64.0 |
| r36 = ∞ | d36 = 19.50 | n20 = 1.841 | ν20 = 25.0 |
| r37 = ∞ | d37 = 9.87 | | |

Zoom (2,050 mm)

| Unit distance | Wide | Tele |
|---|---|---|
| d10 | 29.53 | 6.71 |
| d12 | 2.51 | 19.10 |
| d15 | 3.93 | 15.47 |
| d17 | 42.49 | 5.96 |
| d22 | 5.78 | 2.00 |
| d28 | 6.94 | 19.27 |
| d32 | 7.76 | 30.43 |

(B) Aspheric coefficients

| | K | A | B | C |
|---|---|---|---|---|
| r1 | 0 | 5.59393E−06 | −4.43720E−09 | 5.58718E−12 |
| r3 | 0 | −3.84698E−06 | 1.10923E−09 | −6.65578E−13 |

| | D | E | F | G |
|---|---|---|---|---|
| r1 | −6.07763E−15 | 5.10934E−18 | −2.58504E−21 | 5.88571E−25 |
| r3 | −2.22195E−16 | 0 | 0 | 0 |

(C) Value of conditions

| | |
|---|---|
| (1) | 0.86 |
| (2) | −5.73 |
| (3) | 8.6 |
| (4) | 0.001 < 0.010 |
| (5) | 30.69° |

Various values

| | |
|---|---|
| φa | −0.008 |
| φb | −0.007 |
| φw | 0.044 |
| Rc | 269.66 |
| Rm | 31.35 |
| Fw | 2.60 |
| P | 0.004 |
| pFw | 0.010 |
| dL | 0.001 |
| ωw | 30.69 |

TABLE 2

(Numerical example 2)

(A) lens configuration

| | Wide | Tele |
|---|---|---|
| f | 22.75 | 39.95 |
| F | 2.10 | 2.40 |
| Field angle | 30.7 | 18.7 |
| Total lens length | 220.0 | |
| BF | 72.5 | |
| Zoom ratio | | 1.76 |

| | | | | |
|---|---|---|---|---|
| * | r1 = 823.76 | d1 = 3.00 | n1 = 1.516 | ν1 = 64.1 |
| | r2 = 64.30 | d2 = 10.44 | | |
| * | r3 = 55.96 | d3 = 3.00 | n2 = 1.773 | ν2 = 49.6 |
| | r4 = 34.30 | d4 = 14.14 | | |
| | r5 = −231.38 | d5 = 2.10 | n3 = 1.497 | ν3 = 81.5 |
| | r6 = 76.89 | d6 = 8.98 | | |
| | r7 = −41.34 | d7 = 2.00 | n4 = 1.497 | ν4 = 81.5 |
| | r8 = −1088.75 | d8 = 2.00 | | |
| | r9 = 453.13 | d9 = 6.49 | n5 = 1.694 | ν5 = 50.8 |
| | r10 = −61.85 | d10 = variable | | |
| | r11 = 84.82 | d11 = 5.13 | n6 = 1.678 | ν6 = 55.3 |

TABLE 2-continued

(Numerical example 2)

| | | | | |
|---|---|---|---|---|
| | r12 = −180.02 | d12 = variable | | |
| | r13 = 68.91 | d13 = 5.64 | n7 = 1.717 | ν7 = 29.5 |
| | r14 = −106.51 | d14 = 1.82 | n8 = 1.805 | ν8 = 25.5 |
| | r15 = 382.04 | d15 = variable | | |
| | r16 = −437.78 | d16 = 1.60 | n9 = 1.717 | ν9 = 47.9 |
| | r17 = 52.09 | d17 = variable | | |
| ST | r18 = ∞ | d18 = 7.22 | | |
| | r19 = −35.00 | d19 = 1.60 | n10 = 1.606 | ν10 = 43.7 |
| | r20 = −207.39 | d20 = 0.75 | | |
| | r21 = 103.61 | d21 = 5.57 | n11 = 1.808 | ν11 = 22.8 |
| | r22 = −64.92 | d22 = variable | | |
| | r23 = −209.02 | d23 = 1.80 | n12 = 1.855 | ν12 = 24.8 |
| | r24 = 59.00 | d24 = 7.54 | n13 = 1.516 | ν13 = 64.1 |
| | r25 = −59.00 | d25 = 1.00 | | |
| | r26 = −508.97 | d26 = 8.56 | n14 = 1.607 | ν14 = 56.8 |
| | r27 = −28.99 | d27 = 2.00 | n15 = 1.855 | ν15 = 24.8 |
| | r28 = −85.44 | d28 = variable | | |
| | r29 = 154.13 | d29 = 9.15 | n16 = 1.439 | ν16 = 94.7 |
| | r30 = −43.07 | d30 = 2.00 | | |
| | r31 = −42.27 | d31 = 2.10 | n17 = 1.673 | ν17 = 38.2 |
| | r32 = −79.35 | d32 = variable | | |
| | r33 = 80.48 | d33 = 4.81 | n18 = 1.946 | ν18 = 18.0 |
| | r34 = 239.65 | d34 = 4.50 | | |
| | r35 = ∞ | d35 = 38.70 | n19 = 1.516 | ν19 = 64.0 |
| | r36 = ∞ | d36 = 19.50 | n20 = 1.841 | ν20 = 25.0 |
| | r37 = ∞ | d37 = 9.76 | | |

Zoom (2,050 mm)

| Unit distance | Wide | Tele |
|---|---|---|
| d10 | 30.41 | 6.69 |
| d12 | 3.64 | 19.90 |
| d15 | 3.62 | 15.27 |
| d17 | 41.54 | 5.89 |
| d22 | 5.55 | 2.00 |
| d28 | 6.87 | 19.05 |
| d32 | 7.92 | 30.74 |

(B) Aspheric coefficients

| | K | A | B | C |
|---|---|---|---|---|
| r1 | 0 | 5.46215E−06 | −4.32383E−09 | 5.42399E−12 |
| r3 | 0 | −3.84084E−06 | 1.14932E−09 | −4.29521E−13 |

| | D | E | F | G |
|---|---|---|---|---|
| r1 | −6.22502E−15 | 5.42675E−18 | −2.81161E−21 | 6.35823E−25 |
| r3 | −6.27667E−17 | 0 | 0 | 0 |

(C) Value of conditions

| | |
|---|---|
| (1) | 1.11 |
| (2) | −5.93 |
| (3) | 23.4 |
| (4) | 0.002 < 0.008 |
| (5) | 30.70° |

Various values

| | |
|---|---|
| φa | −0.007 |
| φb | −0.008 |
| φw | 0.044 |
| Rc | 823.76 |
| Rm | 35.17 |
| Fw | 2.10 |
| p | 0.004 |
| pFw | 0.008 |
| dL | 0.002 |
| ωw | 30.70 |

TABLE 3

(Numerical example 1)

(A) lens configuration

| | Wide | Tele |
|---|---|---|
| f | 22.75 | 39.94 |
| F | 2.10 | 2.40 |
| Field angle | 30.7 | 18.7 |
| Total lens length | 220.0 | |
| BF | 72.5 | |
| Zoom ratio | | 1.76 |

| | | | | |
|---|---|---|---|---|
| * | r1 = 468.60 | d1 = 3.00 | n1 = 1.516 | ν1 = 64.14 |
| | r2 = 46.55 | d2 = 11.52 | | |
| * | r3 = 49.28 | d3 = 3.00 | n2 = 1.773 | ν2 = 49.60 |
| | r4 = 37.26 | d4 = 14.71 | | |
| | r5 = −368.58 | d5 = 2.10 | n3 = 1.497 | ν3 = 81.54 |
| | r6 = 70.94 | d6 = 8.98 | | |
| | r7 = −43.56 | d7 = 2.00 | n4 = 1.497 | ν4 = 81.54 |
| | r8 = 768.82 | d8 = 2.00 | | |
| | r9 = 284.00 | d9 = 6.37 | n5 = 1.694 | ν5 = 50.81 |
| | r10 = −68.34 | d10 = variable | | |
| | r11 = 89.65 | d11 = 5.22 | n6 = 1.678 | ν6 = 55.34 |
| | r12 = −150.30 | d12 = variable | | |
| | r13 = 64.33 | d13 = 5.88 | n7 = 1.717 | ν7 = 29.52 |
| | r14 = −118.57 | d14 = 1.84 | n8 = 1.805 | ν8 = 25.46 |
| | r15 = 236.69 | d15 = variable | | |
| | r16 = −534.01 | d16 = 1.60 | n9 = 1.717 | ν9 = 47.93 |
| | r17 = 50.74 | d17 = variable | | |
| ST | r18 = ∞ | d18 = 7.19 | | |
| | r19 = −34.96 | d19 = 1.60 | n10 = 1.606 | ν10 = 43.71 |
| | r20 = −208.44 | d20 = 0.75 | | |
| | r21 = 107.46 | d21 = 5.49 | n11 = 1.808 | ν11 = 22.76 |
| | r22 = −64.68 | d22 = variable | | |
| | r23 = −235.06 | d23 = 1.80 | n12 = 1.855 | ν12 = 24.80 |
| | r24 = 58.66 | d24 = 7.54 | n13 = 1.516 | ν13 = 64.14 |
| | r25 = −58.66 | d25 = 1.00 | | |
| | r26 = −424.20 | d26 = 8.42 | n14 = 1.607 | ν14 = 56.82 |
| | r27 = −29.25 | d27 = 1.90 | n15 = 1.855 | ν15 = 24.80 |
| | r28 = −86.96 | d28 = variable | | |
| | r29 = 145.43 | d29 = 9.12 | n16 = 1.439 | ν16 = 94.66 |
| | r30 = −43.56 | d30 = 2.00 | | |
| | r31 = −42.70 | d31 = 2.25 | n17 = 1.673 | ν17 = 38.15 |
| | r32 = −79.00 | d32 = variable | | |
| | r33 = 83.91 | d33 = 4.58 | n18 = 1.946 | ν18 = 18.0 |
| | r34 = 274.51 | d34 = 4.50 | | |
| | r35 = ∞ | d35 = 38.70 | n19 = 1.516 | ν19 = 64.0 |
| | r36 = ∞ | d36 = 19.50 | n20 = 1.841 | ν20 = 25.0 |
| | r37 = ∞ | d37 = 9.77 | | |

Zoom (2,050 mm)

| Unit distance | Wide | Tele |
|---|---|---|
| d10 | 30.14 | 6.92 |
| d12 | 2.50 | 18.42 |
| d15 | 4.01 | 15.31 |
| d17 | 41.36 | 5.92 |
| d22 | 5.56 | 2.00 |
| d28 | 6.30 | 18.28 |
| d32 | 8.26 | 31.28 |

(B) Aspheric coefficients

| | K | A | B | C |
|---|---|---|---|---|
| r1 | 0 | 0 | 5.16896E−06 | −4.15299E−09 |
| r3 | 0 | 0 | −3.32174E−06 | 6.96215E−10 |

| | K | D | E | F | G |
|---|---|---|---|---|---|
| r1 | 0 | 5.37865E−12 | −6.25089E−15 | 5.43666E−18 | −2.78033E−21 |
| r3 | 0 | −7.14958E−13 | −1.72774E−17 | 0 | 0 |

(C) Value of conditions

| (1) | 0.45 |
|---|---|
| (2) | −4.40 |
| (3) | 13.2 |

TABLE 3-continued (Numerical example 1)

| | | |
|---|---|---|
| (4) | 0.001 < 0.008 | |
| (5) | 30.70° | |

| Various values | |
|---|---|
| φa | −0.010 |
| φb | −0.005 |
| φw | 0.044 |
| Rc | 468.60 |
| Rm | 35.41 |
| Fw | 2.10 |
| p | 0.004 |
| pFW | 0.008 |
| dL | 0.001 |
| ωw | 30.70 |

The refractive powers of each entire lens unit and of each lens included in each lens unit and a glass material of each lens unit are not limited to those in the above-described embodiments. The negative lens units (such as B1a and B1b) may be fixed during at least one of variation of magnification (zooming) and focusing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132432, filed on Jul. 6, 2017, which is hereby incorporated by reference herein in its entirety.

What is claimed is:

1. An optical system comprising:
an aperture stop;
a plurality of lenses disposed on an enlargement conjugate side further than the aperture stop; and
at least one lens disposed on a reduction conjugate side further than the aperture stop,
wherein:
the plurality of lenses includes, in order from the enlargement conjugate side to the reduction conjugate side, a first movable negative lens unit and a second movable negative lens unit each having a negative refractive power for changing field curvature by being moved in an optical axis direction of the optical system;
the first and second movable negative lens units are moved such that at least one of their movement directions and their movement amounts are mutually different; and
the first and second movable negative lens units are moved such that change in conjugate length of an entire system of the optical system is reduced.

2. An optical system according to claim 1, wherein the first and second movable negative lens units are mutually adjacent in the optical axis direction.

3. An optical system according to claim 1, wherein the first movable negative lens unit is disposed at a most-enlargement conjugate side position in the optical system.

4. An optical system according to claim 1, wherein the first and second movable negative lens units are moved to mutually opposite sides in the optical axis direction.

5. An optical system according to claim 1, wherein the following condition is satisfied:

$$0.01 \le \varphi b/\varphi a \le 3.00$$

where φa represents the negative refractive power of the first movable negative lens unit, and φb represents the negative refractive power of the second movable negative lens unit.

6. An optical system according to claim 1, wherein the negative refractive power of the first movable negative lens unit is stronger than that of the second movable negative lens unit.

7. An optical system according to claim 1, wherein at least one of the first and second movable negative lens units has an aspheric lens surface.

8. An optical system according to claim 1, wherein each of the first and second movable negative lens units is constituted by one lens.

9. An optical system according to claim 1, wherein:
the optical system is configured to perform variation of magnification and focusing; and
the first and second movable negative lens units are fixed during at least one of the variation of magnification and the focusing.

10. An optical system according to claim 9, wherein the first and second movable negative lens units are fixed during both the variation of magnification and the focusing.

11. An optical system according to claim 9, wherein the following condition is satisfied:

$$-8 \le \varphi w/\varphi a \le -3$$

where φa represents the negative refractive power of the first movable negative lens unit, and φw represents a refractive power of the entire system of the optical system at its wide-angle end.

12. An optical system according to claim 9, wherein the following condition is satisfied:

$$25° \le \omega w \le 36°$$

where ωw represents an angle formed by an optical axis of the optical system and an outermost off-axis ray.

13. An image projection apparatus comprising:
a light modulation element configured to modulate light from a light source; and
an optical system configured to project the light from the light modulation element,
wherein the optical system comprises:
an aperture stop;
a plurality of lenses disposed on an enlargement conjugate side further than the aperture stop; and
at least one lens disposed on a reduction conjugate side further than the aperture stop,
wherein:
the plurality of lenses includes, in order from the enlargement conjugate side to the reduction conjugate side, a first movable negative lens unit and a second movable negative lens unit each having a negative refractive power for changing field curvature by being moved in an optical axis direction of the optical system;

the first and second movable negative lens units are moved such that at least one of their movement directions and their movement amounts are mutually different; and the first and second movable negative lens units are moved such that change in conjugate length of an entire system of the optical system is reduced.

14. An image projection apparatus comprising:

a light modulation element configured to modulate light from a light source; and an optical system configured to project the light from the light modulation element, wherein the optical system comprises:

an aperture stop;

a plurality of lenses disposed on an enlargement conjugate side further than the aperture stop; and at least one lens disposed on a reduction conjugate side further than the aperture stop, wherein:

the plurality of lenses includes, in order from the enlargement conjugate side to the reduction conjugate side, a first movable negative lens unit and a second movable negative lens unit each having a negative refractive power for changing field curvature by being moved in an optical axis direction of the optical system;

the first and second movable negative lens units are moved such that at least one of their movement directions and their movement amounts are mutually different; and the optical system is configured to perform variation of magnification; and the following condition is satisfied:

$$dL \leq pFw$$

where dL represents a change amount of a conjugate length between before and after the movement of the first and second movable negative lens units, p represents a pixel pitch of the light modulation element, and Fw represents an F-number of the optical system at its wide-angle end.

15. An optical system comprising:

an aperture stop;

a plurality of lenses disposed on an enlargement conjugate side further than the aperture stop; and at least one lens disposed on a reduction conjugate side further than the aperture stop, wherein:

the plurality of lenses includes, in order from the enlargement conjugate side to the reduction conjugate side, a first movable negative lens unit and a second movable negative lens unit each having a negative refractive power for changing field curvature by being moved in an optical axis direction of the optical system;

the first and second movable negative lens units are moved such that at least one of their movement directions and their movement amounts are mutually different; and the following condition is satisfied:

$$0.01 \leq \varphi b/\varphi a \leq 3.00$$

where $\varphi a$ represents the negative refractive power of the first movable negative lens unit, and $\varphi b$ represents the negative refractive power of the second movable negative lens unit.

* * * * *